Figure 1:
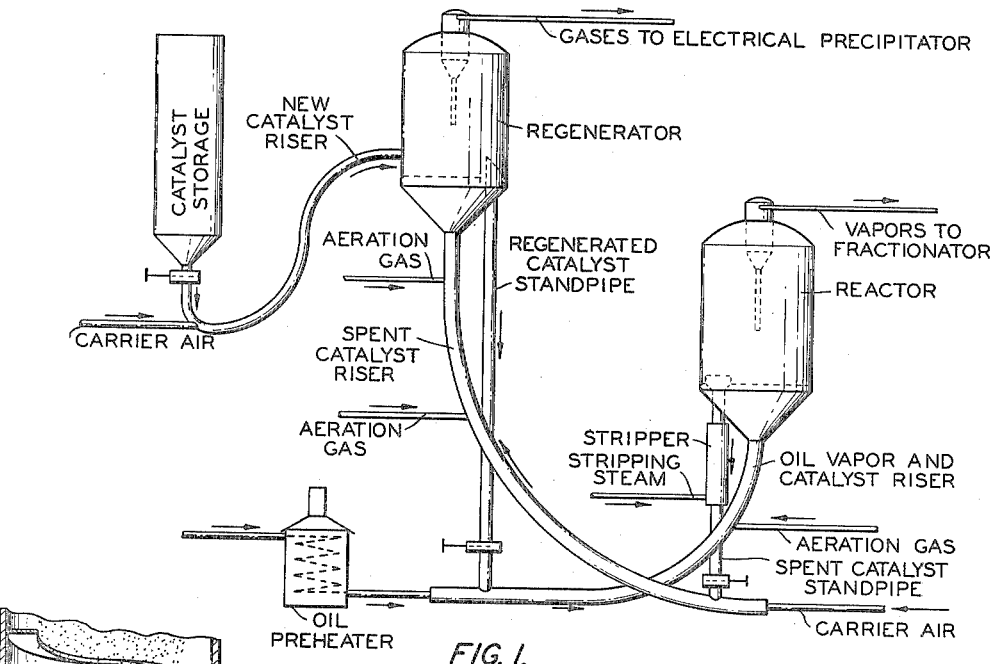

Sept. 18, 1956  J. M. BROOKE ET AL  2,763,516
CONVEYING OF FLUIDIZED MASS OF PARTICLE
AND APPARATUS THEREFOR
Filed Oct. 1, 1951

INVENTORS.
J. M. BROOKE
R. M. WALDBY

BY Hudson & Young
ATTORNEYS

United States Patent Office 2,763,516
Patented Sept. 18, 1956

2,763,516

CONVEYING OF FLUIDIZED MASS OF PARTICLES AND APPARATUS THEREFOR

Jesse M. Brooke and Roy M. Waldby, Bartlesville, Okla., assignors to Phillips Petroleum Company, a corporation of Delaware Application October 1, 1951, Serial No. 249,188

10 Claims. (Cl. 302—64)

This invention relates to the conveying of a fluidized mass of particles, for example, catalyst particles from one locus to another, in operation making use of such particles, for example, a fluidized catalytic cracking operation.

The art of catalytic cracking employing a fluidized catalyst is sufficiently well-known to here dispense with a description of a conventional type of such an operation. Suffice to say, that in such an operation fluidized masses of catalyst are conveyed, especially in an upwardly direction, in a conduit, for example, from a locus at the bottom of a catalytic reactor to a locus within a catalyst regenerator, the locus in the catalyst regenerator being at an elevation substantially higher than that from which the catalyst is conveyed; that is, the bottom of the said reactor. For this conveying operation air is employed usually.

When the regenerated catalyst is conveyed to the reactor, the hydrocarbon to be treated is employed as the fluidizing medium. Also, fresh catalyst is sometimes fluidized and raised with air by means of an air lift to the top of a catalytic reactor through which it flows in a downwardly direction after suitable steaming or other operation to remove the air therefrom.

In the conveying of such fluidized masses as fluidized catalyst particles in an upwardly direction there is encountered a problem known as "bumping" due to the formation of slugs, or otherwise put, channeling of fluidizing medium in the riser conduit. Thus in the fluidized catalyst streams, as found in risers which are usually rather dilute phase streams, the fluidizing medium or gas or vapor is found to travel along or near to the wall of the conduit while there occurs a lagging behind or slugging of the catalyst particles toward the core or longtiudinal axis of the riser, in effect, the fluidizing medium traveling upwardly considerably faster than corresponding portions of fluidized catalyst particles. Every so often due to the slugging there collects a sufficient amount of catalyst particles to offer a sufficient resistance to the flow of gases to cause said gases to expel the excess mass or slug. It is this action which results in bumping. This problem is quite serious when one considers the size and nature of equipment involved in the modern cracking unit which is one place in which this problem has been encountered. It appears that the problem is quite complex in that several factors such as ratio of height to diameter of the catalytic bed or regenerator bed above the riser, the particle size distribution or particle sizes in the riser, as well as the difference in density between the catalyst and fluidizing medium, will influence fluidization and therefore are connected with or intimately involved in the problem. Whenever the top end of the riser is located below and in open communication with a bed of catalyst the same factors which influence fluidization in the riser will influence fluidization in the said bed and in turn the said bed will influence the nature of the slugs and consequent bumping which occurs.

According to this invention there is provided a novel apparatus and method for conveying a fluidized mass of particles in an upwardly direction through a conduit, or riser, in which said particles tend to slug and to cause bumping, as described herein, which comprise providing in the said conduit a protrusion extending inwardly from the wall thereof and causing the upwardly moving fluidized mass of particles to impinge upon said protrusion.

Figure 2:
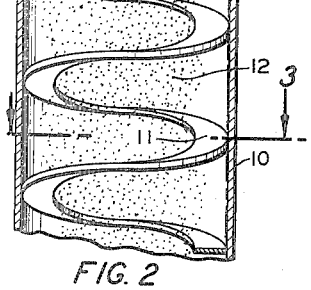
Figure 3:
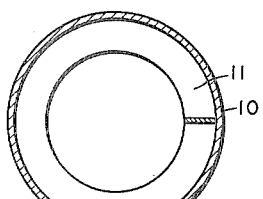
Figure 5:
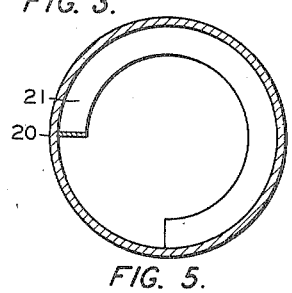
Figure 4:
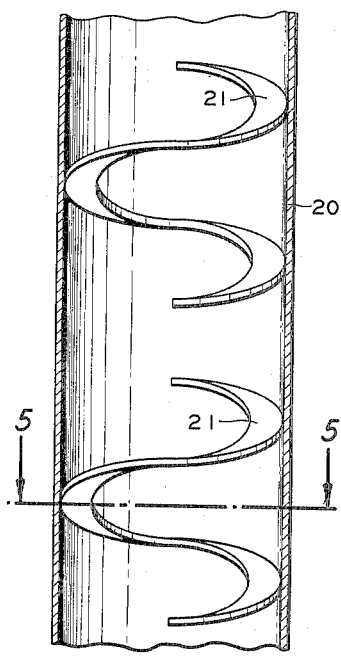
Figure 6:
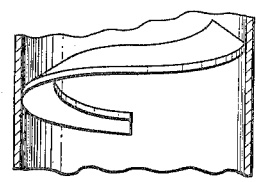
Figure 7:
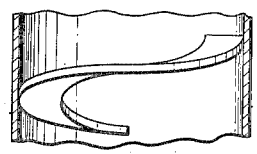

In the drawing Figure 1 is a considerably simplified diagrammatic flow plan of a conventional fluidized catalyst cracking operation showing a number of the places in the said operation at which the problem solved by the present invention can be encountered. One skilled in the art, possessed of this disclosure, will at once appreciate, following the legend on Figure 1, the general character of the operation and the application of the invention thereto. Figure 2 of the drawing is a cross section of a riser conduit modified according to this invention. Figure 3 of the drawing is a plan view of Figure 2 at the line 3—3. Figures 4 and 5 are cross section and plan views of a different embodiment of a riser conduit modified according to this invention. In Figures 2 and 3, 10 denotes the conduit or riser-tube wall, 11 denotes a helical flight and 12 denotes a fluidized mass of particles traveling upwardly in said riser-tube or conduit. The helical flight 11 can be either normal to the riser tube wall as shown in Figure 7 or at an angle with said wall as in Figure 6. In Figures 4 and 5 the helical flight 21 is not continuous as in Figures 2 and 3. The actual configuration of the helical flight to be used will vary for different processes and for different operating units of a given process according to operating conditions.

In a specific embodiment of the invention a riser having an internal conduit diameter of six feet can be equipped with a spiral extending six inches inwardly from the wall thereof. Within the range of 0.05–0.12 of the internal diameter of the riser conduit the results of the invention can be readily obtained.

As a further discussion of the invention but not by way of limiting it to any theory or inherent operation it can be stated that the condition which exists in a riser is known as dilute phase fluidization. Steady flow is dependent upon the homogeneity of the catalyst and gas. Fluctuating loadings cause fluctuating pressure drops which are transmitted throughout the system causing surging. The helical flights are intended to act as continuous mixers to prevent separation of the phases thus preventing fluctuating loadings. Also, as stated, the flights present a tortourous path to any air tending to channel along the sides of the riser. A second effect is the centrifugal motion given the catalyst and air leaving the riser. This gives a better distribution of catalyst and air below the grid of the regenerator and will tend to prevent bumping and channeling.

Reasonable variation and modification are possible within the scope of the foregoing disclosure, drawing and the appended claims to the invention the essence of which is that by providing a protrusion internally of a riser-tube or conduit employed to convey in a substantially upward direction a fluidized mass of particles the phenomenon of "bumping" has been virtually eliminated.

We claim:

1. In the art of conveying a fluidized mass of particles in which the particles and fluidizing medium travel together substantially as homogeneous fluid in an upwardly direction through a conduit into the mass of a bed of said fluidized particles the step of causing an outer portion of said mass of particles to impinge upon a protrusion within said conduit and extending upwardly from the inside of the wall of said conduit so as to cause said fluidizing medium to be returned into the main body of particles traveling in the core of the conduit, 2. The art of claim 1 wherein the fluidized mass is composed of catalyst particles and a hydrocarbon vapor.

3. The art of claim 2 wherein the protrusion extending inwardly in the said conduit is a helical flight.

4. In the fluidized cracking art wherein a catalyst is fluidized with a hydrocarbon vapor when cracking of said vapor is desired to be effected and with regenerative gases when said catalyst is to be regenerated, wherein the mass of fluidized catalyst and fluidizing medium employed travel together substantially as a homogeneous fluid and wherein said fluidized catalyst is conveyed upwardly into the bottom of a bed of said fluidized particles in and through a riser conduit resulting in bumping therein, due to slug formation caused by the faster travel of the fluidized vapor and gas near the walls of said riser conduit than of the particles in the core of said conduit, the step of causing the fluidized mass to impinge upon a protrusion fixed to the inner wall of said riser conduit, adapted to cause the vapor and gas to be urged toward the axis and thus returned into the core of said riser conduit to there maintain it in proper admixture with said catalyst.

5. A conduit adapted to convey in a substantially upwardly direction a mass of fluidized particles, said mass being characterized by the particles and fluidizing medium traveling together substantially as a homogeneous fluid but during travel of which some of the fluid tends to travel along the inner wall of said conduit with creation of portions of denser phase in axial locations in said conduit, the said conduit having protruding from the inner wall thereof toward the longitudinal axis thereof, but not reaching the said axis, a series of substantially longitudinally traveling but not longitudinally disposed plates adapted to cause fluidizing medium which is employed, and which travels near the walls of said conduit, to return to within the mass of fluidized particles within the core of said conduit and to travel along therewith at substantially the velocity thereof.

6. In the art of conveying a fluidized mass of particles in which the particles and fluidizing medium travel together substantially as a homogeneous fluid in an upwardly direction through a conduit into the mass of a bed of said fluidized particles the step of causing an outer portion of said mass of particles to impinge upon a series of protrusions within said conduit and extending upwardly from the inside of the wall of said conduit so as to cause said fluidizing medium to be returned to within the main body of particles traveling in the core of the conduit.

7. In the art of conveying a fluidized mass of particles in which the particles and fluidizing medium travel together substantially as a homogeneous fluid in an upwardly direction through a conduit into the mass of a bed of said fluidized particles the step of causing an outer portion of said mass of particles to impinge upon a protrusion within said conduit and extending upwardly from the inside of the wall of said conduit, the protrusion in said conduit extending inwardly 0.05–0.12 of the internal diameter of said conduit so as to cause said fluidizing medium to be returned to within the main body of particles traveling in the core of the conduit.

8. An apparatus for converting a hydrocarbon in the presence of a fluidized mass of catalyst and for regenerating a spent catalyst which comprises in combination a vessel adapted to contain a bed of fluidized catalyst therein, a riser conduit having a diameter of the order of about six feet in open communication with said vessel, at the bottom thereof, and a protrusion in said conduit extending inwardly 0.05–0.12 of the internal diameter of said conduit said protrusion being of form such as to cause fluid traveling along the wall of the riser conduit to be returned to the axis thereof by imparting to said fluid a flow in a direction from said wall toward the axis of said conduit.

9. An apparatus for converting a hydrocarbon in the presence of a fluidized mass of catalyst and for regenerating a spent catalyst which comprises in combination a vessel adapted to contain a bed of fluidized catalyst therein, a riser conduit having a diameter of the order of about six feet in open communication with said vessel, at the bottom thereof, said a helical flight in said conduit extending inwardly 0.05–0.12 of the internal diameter of said conduit, said helical flight being of form such as to cause fluid traveling along the wall of the riser conduit to be returned to the axis thereof by imparting to said fluid a flow in a direction from said wall toward the axis of said conduit.

10. An apparatus for converting a hydrocarbon in the presence of a fluidized mass of catalyst and for regenerating a spent catalyst which comprises in combination a vessel adapted to contain a bed of fluidized catalyst therein, a riser conduit having a diameter of the order of about six feet in open communication with said vessel, at the bottom thereof, and in said conduit a series of discontinuous flights extending inwardly 0.05–0.12 of the internal diameter of said conduit, said discontinuous flights being of form such as to cause fluid traveling along the wall of the riser conduit to be returned to the axis thereof by imparting to said fluid a flow in a direction from said wall toward the axis of said conduit.

References Cited in the file of this patent

UNITED STATES PATENTS

| Number | Name | Date |
|---|---|---|
| 855,651 | Milne | June 4, 1907 |
| 1,451,272 | Robinson | Apr. 10, 1923 |
| 1,707,335 | Van Brunt | Apr. 2, 1929 |
| 1,840,857 | Testrup | June 12, 1932 |
| 2,304,827 | Jewell | Dec. 15, 1942 |
| 2,370,816 | Schonberg | Mar. 6, 1945 |
| 2,398,228 | Hunt | Apr. 9, 1946 |
| 2,398,759 | Angell | Apr. 23, 1946 |
| 2,435,927 | Manning | Feb. 10, 1948 |
| 2,667,448 | Munday | Jan. 26, 1954 |
| 2,685,873 | Berg | July 27, 1954 |